(12) United States Patent
Szöke et al.

(10) Patent No.: US 7,909,390 B2
(45) Date of Patent: Mar. 22, 2011

(54) VEHICLE COCKPIT WITH SELF SUPPORTING SUBMODULES

(75) Inventors: Levente Szöke, Dieburg (DE); Thomas Vorberg, Goldbach (DE)

(73) Assignee: Siemens Aktiengesellschaft, München (DE)

( * ) Notice: Subject to any disclaimer, the term of this patent is extended or adjusted under 35 U.S.C. 154(b) by 393 days.

(21) Appl. No.: 11/807,563

(22) Filed: May 29, 2007

(65) Prior Publication Data

US 2007/0290524 A1 Dec. 20, 2007

(30) Foreign Application Priority Data

May 31, 2006 (DE) .......................... 10 2006 025 384

(51) Int. Cl.
*B60K 37/00* (2006.01)
(52) U.S. Cl. .................................... 296/193.02; 296/70
(58) Field of Classification Search ............. 296/193.02, 296/193.03, 191, 192, 70
See application file for complete search history.

(56) References Cited

U.S. PATENT DOCUMENTS

| | | | |
|---|---|---|---|
| 4,813,736 A | 3/1989 | Schubert et al. | |
| 5,005,898 A * | 4/1991 | Benedetto et al. | 296/193.02 |
| 6,129,406 A | 10/2000 | Dauvergne | |
| 2007/0062734 A1 * | 3/2007 | Appel et al. | 174/520 |

FOREIGN PATENT DOCUMENTS

| | | |
|---|---|---|
| DE | 27 34 066 | 9/1978 |
| DE | 30 17 053 | 11/1981 |
| DE | G 83 37 425.6 | 4/1984 |
| DE | 36 17 961 | 12/1987 |
| DE | 196 80 933 | 4/1997 |
| DE | 696 04 698 | 10/1998 |
| DE | 198 23 602 | 12/1999 |
| DE | 198 54 120 | 5/2000 |
| DE | 103 17 900 | 11/2004 |
| EP | 0 048 602 | 3/1982 |
| FR | 2 765 175 | 12/1998 |
| GB | 1 585 816 | 3/1981 |
| WO | WO 97/13675 | 4/1997 |

OTHER PUBLICATIONS

German Office Action dated Jan. 22, 2007 issued in corresponding application No. 10 2006 025 384.1.

* cited by examiner

*Primary Examiner* — Glenn Dayoan
*Assistant Examiner* — Melissa A Black
(74) *Attorney, Agent, or Firm* — Cohen Pontani Lieberman & Pavane LLP

(57) ABSTRACT

A vehicle cockpit of modular construction includes at least one crossmember extending over the width of the cockpit and at least two submodules, each of which accommodates pre-assembled components. The submodules can each be fastened to the crossmember. The submodules are self-supporting so that they are able to be freely handled as preassembled subassemblies and so that they pass on their own weight and external loads directly to the crossmember. Installation and fitting the vehicle cockpit of modular construction includes first preassembling a plurality of submodules with a variety of different components groupings, selecting ones of the preassembled submodules to be installed, and connecting the selected submodules to the crossmember.

12 Claims, 2 Drawing Sheets

VEHICLE COCKPIT WITH SELF SUPPORTING SUBMODULES

BACKGROUND OF THE INVENTION

1. Field of the Invention

The present invention relates to a vehicle cockpit of modular construction, with at least one crossmember running over the width of the cockpit, and at least two submodules which accommodate components and can each be fastened to the crossmember.

2. Description of the Related Art

As is known, vehicle cockpits comprise supporting parts, a substructure, technical components and visible surfaces. The technical components are either fastened directly to the supporting parts or to the substructure, also referred to as the instrument panel. The visible surfaces are fitted to the substructure. A part of the cockpit made from various components is first assembled on a supporting substructure and then inserted into the vehicle. In addition, individual components, for example audio system, navigation system or air-conditioning device, are subsequently fitted in situ into the cockpit within the vehicle. A substantial drawback here is that checking the individual devices is only possible after the vehicle cockpit is completed. The consequence resulting from this drawback is that when defective parts need to be exchanged, removal of other parts may also be required if the defective parts are not directly accessible. A possible solution for simplifying the complicated and complex installation operation involves fastening the vehicle cockpit, comprising the various individual parts including the visible surfaces, to a supporting structure outside the vehicle and then fitting it as a whole into a vehicle. However, the introduction and the fitting of an assembled vehicle cockpit into a vehicle are difficult and require extremely precise handling.

To simplify the cockpit installation operation, WO 97/13675 discloses an instrument panel which is designed as a self-supporting unit and is constructed from a number of modules. The modules are designed in such a manner that they are connected to one another and do not require an additional component which extends along all of the modules. The modules are assembled outside the vehicle to form a unit and are inserted as an entire instrument panel into the vehicle. This particular solution is used in trucks and buses.

In addition to the complicated installation operation, a further drawback of the known solutions is that a decision regarding which equipment will be installed in the vehicle cockpit has to take place at a relatively early point in the assembly of the vehicle because the installation sequence requires that a relatively large period of time is always required to fit or install the vehicle's equipment in accordance with customer requirements.

SUMMARY OF THE INVENTION

The object of the present invention is to provide a vehicle cockpit of modular construction which simplifies the manufacturing sequence.

The object of the present invention is met by a vehicle cockpit, in which submodules are self-supporting so that they may be freely handled as preassembled subassemblies and so that they pass on their own weight and external loads to the crossmember in the fitted or installed state.

The advantage of the vehicle cockpit according to the invention is that the handling and the fitting of the submodules into a vehicle is simpler than the insertion of an entire vehicle cockpit into a vehicle, since the submodules are smaller and lighter than an entire vehicle cockpit. Although the components already fitted in the preassembled submodules lead to a corresponding weight of the submodules, the latter, on account of the self-supporting design, can also be moved dynamically, for example during handling by robots within the scope of automated manufacturing. A further aspect relates to the logistical sequences during the installation, which will be discussed later on. The submodules can be preassembled independently of the assembly of the vehicle, and therefore the preconfigured submodules can then be combined in a short time, which reduces the period of time between customer order and delivery to the customer, since the final installation requires less time because of the preassembled submodules. In addition to this, the submodules can have a higher packing density, since they are accessible from all sides prior to fitting. As a result, the construction space in the cockpit can be used better, which is of increasing importance in conjunction with the increasing equipping of the vehicle with electronic components to improve vehicle safety and user comfort.

In a preferred embodiment, supporting connections are provided exclusively between the submodules and the crossmember. As a result, the submodules are not in a structural assembly with one another and can be fitted or installed independently of one another.

In a particularly preferred embodiment, the submodules are at least partially provided with finished visible surfaces (A-surfaces) and/or panel parts. This dispenses with the paneling of the cockpit which is customarily undertaken only at the end of cockpit assembly. With the insertion of the submodules according to this embodiment of the present invention, the vehicle cockpit is essentially finished. The panel parts which are preferably already integrated by the supplier signify a reduction in parts, which has a favorable effect on the cost of production and installation.

In a further embodiment, the submodules each have a plastic framework as the basic structure. As a result, the required rigidity can be achieved with minimal weight. In addition, the process of producing the basic structure is more cost-effective than the prior art.

In a further embodiment, the basic structure itself has finished visible surfaces. The finishing of the visible surfaces is preferably integrated into the production of the basic structure. In the fitted state, the visible surfaces are no longer subjected to a finishing operation, since they already have their desired final structure. The visible surfaces may be, for example, covered by foam. In the region of the finished visible surfaces, the requirement for fitting of additional visible surfaces to the basic structure is then dispensed with, as a result of which additional cost advantages arise because of savings on the time for installing the cockpit.

According to yet a further embodiment, the submodules with the preassembled components are checked prior to installation. As a result, any defective components or parts present can be identified prior to being installed into the vehicle and can be exchanged more simply prior to installation. The recognition of errors at an early installation phase signifies an improvement in the quality control of the production of the vehicle.

To satisfy the ever more important aspect of ease of service, in a preferred embodiment, the submodules which are fastened to the crossmember can be removed and re-installed independently of one another. Defective parts of the vehicle cockpit can thus be repaired or exchanged more rapidly, since the components are accessible from all sides only after a submodule is removed. In addition, the independent fitting and removal also allow the changing the equipment of a vehicle after supply, i.e., in the used state. A customer may therefore also retrofit his vehicle with different equipment. The simple removal and re-installation also allows certain equipment components in the form of a submodule to be fitted temporarily into a customer's vehicle for test purposes. The customer is thereby able to determine the equipment suitable for him by trying it out in everyday life. As a result, the customer obtains the option of first of all purchasing a vehicle with basic equipment in order then to expand it over the course of time. New possibilities also arise with different equipment in the sphere of demonstration vehicles to be kept by the dealers, to the effect that the different equipment for one type of vehicle is made available to the customer by removing and re-installing of the submodules. Hitherto, a number of the same type of cars with the different equipment had to be provided for this purpose.

To keep the period of time between the ordering of a vehicle in accordance with customer requirements and the delivery of the vehicle to the customer as small as possible, a fitting method is provided for installing vehicle cockpits into vehicles with different equipment variants, in which submodules are preassembled with different components as self-supporting subassemblies which can be handled freely. These preassembled submodules are kept ready for installation. The equipment of a cockpit of a vehicle is assembled by installing selected ones of the preassembled submodules. As described above, a crossmember is fitted into the vehicle and the selected submodules are fastened to the crossmember in the vehicle. For example, passenger submodules with air-conditioned glove compartment, integrated CD changer or multimedia system or central console submodules with an audio system, air-conditioning system or navigation system can be kept ready. The submodules may also have different surface configurations, for example a leather covering, wood paneling or high-quality sheet-metal applications. By keeping various submodules in stock, a multiplicity of equipment variants can be produced, from which the customer can select the desired variant. For example, with three submodules, i.e. a driver submodule, a passenger submodule and a central console submodule, each in three different embodiments, 27 equipment variants are available.

The submodules are preferably preassembled on a cockpit assembly line, at the end of which they are installed into a vehicle. The assembly of the vehicle takes place independently of the assembly of the cockpit. The decision of the customer regarding the equipment can therefore be taken at a very late time prior to the final assembly of the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is discussed in more detail below with reference to the attached drawings, in which.

DETAILED DESCRIPTION OF THE PRESENTLY PREFERRED EMBODIMENTS

Figure 1:
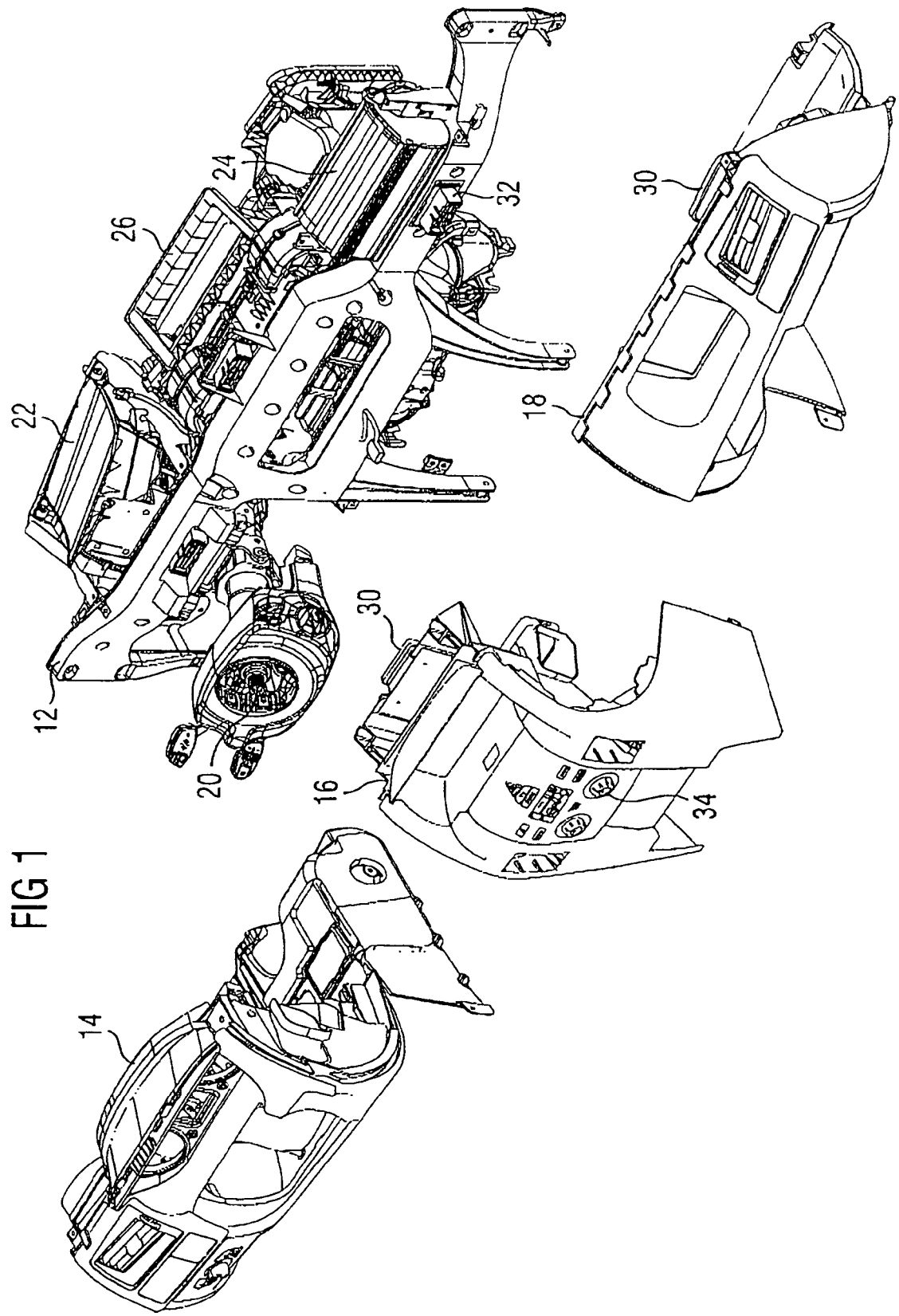
FIG. 1 is a perspective exploded view of a vehicle cockpit of modular construction according to an embodiment of the present invention.

FIG. 1 shows a vehicle cockpit which has a crossmember 12 running over a width of the cockpit, a driver submodule 14, a central console submodule 16 and a passenger submodule 18. A covering (not illustrated) is mounted onto the vehicle cockpit as the top end. Various components and structural members, for example a steering column 20, a head-up display 22, an airbag 24 and a heating system 26, are fastened directly to the crossmember 12 which also takes over the dissipation of lateral forces in the event of a side impact. The submodules 14, 16, 18 are self-supporting so that they are able to be handled freely as preassembled subassemblies. In the fitted state, the submodules 14, 16, 18 introduce their own weight and external loads into the crossmember 12. In this case, supporting connections are provided exclusively between the submodules 14, 16, 18 and the crossmember 12.

Figure 2:
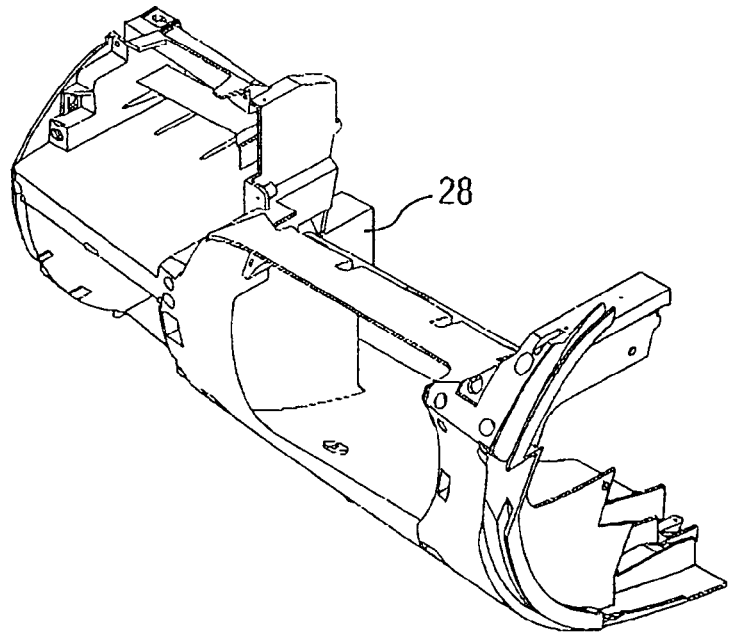
FIG. 2 is a perspective view of a basic structure of one of the submodules of the vehicle cockpit of FIG. 1.
Figure 3:
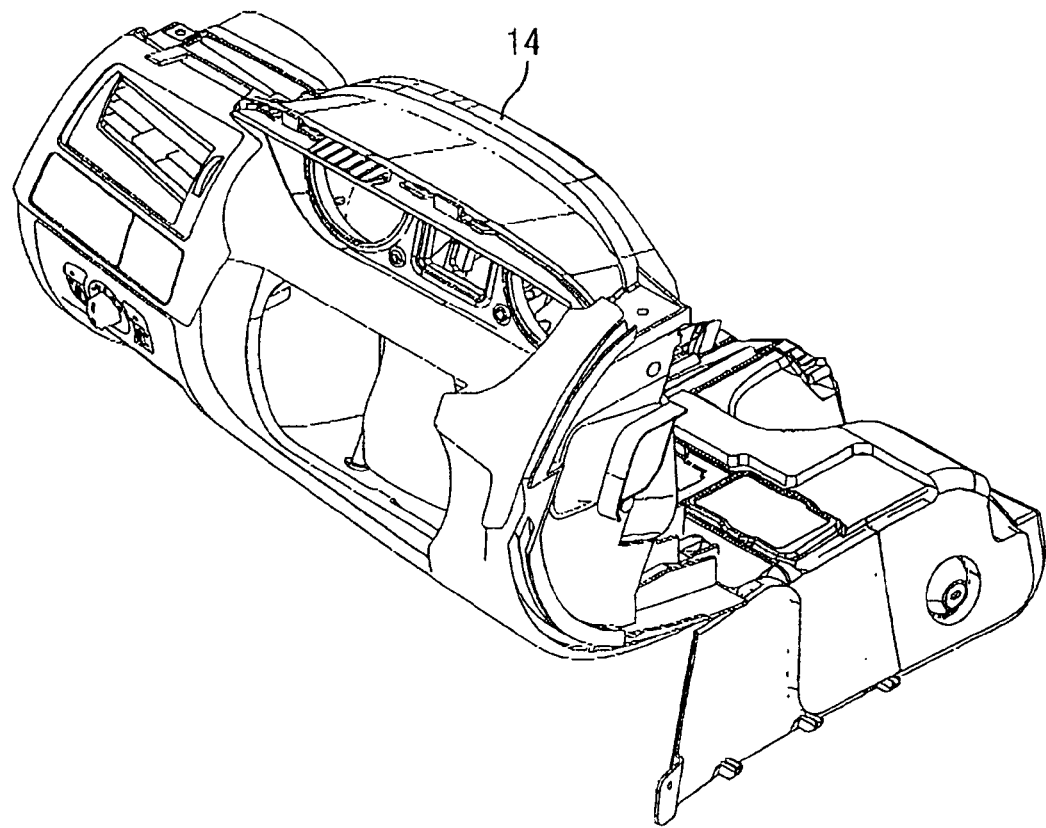
FIG. 3 is a perspective view of the submodule of FIG. 1 in a ready preassembled state.

The submodules 14, 16, 18 have a plastic framework as the basic structure. FIG. 2 shows an example of a plastic framework as a basic structure 28 for the driver submodule 14. The submodules 14, 16, 18 are at least partially provided with finished visible surfaces and panel parts. FIG. 3 shows the ready preassembled driver submodule 14, in which all of the visible surfaces and panels apart from the upper covering are present. The submodules 14, 16, 18 together with the preassembled components can be checked prior to installation in the vehicle cockpit for identification of errors as early as possible. This expediently takes place via a plug 30 or a bushing 32, as are also used for the electrical contact connection between submodule and crossmember 12. By connecting a testing device to this plug connection 30, the submodule 14, 16, 18 can be tested prior to fitting, and therefore parts or components which are found to be defective can be exchanged in a simple manner, since the submodule 14, 16, 18 is freely accessible.

The submodules 14, 16, 18 which are fastened to the crossmember 12 can be removed and installed independently of one another. This results in an ease of servicing not present in the prior art. For example, if a ventilation adjustment flap is defective or a ventilation regulator 34 is defective, the entire vehicle cockpit does not have to be destroyed, but rather it suffices merely to remove the submodule 16 in which the corresponding defective structural member is located, and to replace it. During the assembly of a vehicle, a selection of the equipment to be installed in the cockpit can be undertaken at a relatively late time, since a multiplicity of equipment possibilities can be assembled from a stored quantity of different variants. Each of the submodules 14, 16, 18 are preassembled separately for this purpose with various different groupings of equipment. This is preferably taken on by a supplier of the submodules. Alternatively, the preassembly of the submodules may also take place on a cockpit assembly line which is integrated into the production of the vehicle in such a manner that, at its end, the submodules 14, 16, 18 are fitted into a vehicle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vehicle cockpit of modular construction, comprising: crossmember extending over a width of the cockpit; and
at least two submodules, each of said at least two submodules includes means for checking the preassembled components and each of the at least two submodules accommodating preassembled components,
wherein each of said at least two submodules is self-supporting so that said each of said at least two submodules is freely handled as a preassembled subassembly and directly connected to said crossmember so that said each of said at least two submodules pass their own weight and external loads directly to said crossmember when said each of said at least two submodules is directly connected or fitted to said crossmember.

2. The vehicle cockpit of claim 1, wherein supporting connections are provided exclusively between each of said at least two submodules and said crossmember.

3. The vehicle cockpit of claim 1, wherein said each of said at least two submodules is at least partially provided with one of finished visible surfaces or panel parts.

4. The vehicle cockpit of claim 1, wherein said each of said at least two submodules has a plastic framework as a basic structure.

5. The vehicle cockpit of claim 4, wherein said basic structure has finished visible surfaces.

6. The vehicle cockpit of claim 1, wherein said each of said at least two submodules fastened to said crossmember is independently removable from and re-fittable to said crossmember.

7. An installation method for installing a vehicle cockpit of modular construction, the vehicle cockpit including a crossmember extending over a width of the cockpit, and at least two submodules which accommodate preassembled components, each of the at least two submodules being directly fastened to the crossmember, said method comprising directly fastening the submodules to the crossmember as preassembled subassemblies which are self-supporting and are freely handled as independent units.

8. The installation method of claim 7, wherein said step of fastening comprises fastening each of the at least two submodules exclusively to the crossmember by supporting connections.

9. The installation method of claim 7, further comprising fitting the crossmember in the vehicle cockpit, and said step of fastening includes mounting the at least two submodules on the fitted crossmember.

10. The installation method of claim 7, further comprising the step of checking each of the at least two submodules with the preassembled components for defects prior to said step of fastening.

11. An installation method for installing vehicle cockpits into vehicles with different equipment variants, comprising:
preassembling submodules with different groupings of components as self-supporting subassemblies configured to be handled freely;
keeping a plurality of the preassembled submodules at ready;
selecting preassembled modules to be fitted from the ready preassembled modules;
installing a crossmember into the vehicle; and
fastening the selected submodules directly to the crossmember installed in the vehicle.

12. The installation method of claim 11, wherein the preassembled submodules are preassembled on a cockpit assembly line, and are installed into a vehicle at the end of the cockpit assembly line.

* * * * *